United States Patent
Hammer et al.

(10) Patent No.: US 9,944,251 B2
(45) Date of Patent: Apr. 17, 2018

(54) ENGINE COVER GROMMETS AND METHODS

(71) Applicant: Toyota Motor Engineering & Manufacturing North America, Inc., Erlanger, KY (US)

(72) Inventors: Jeremiah T. Hammer, Ann Arbor, MI (US); Aaron R. Steinhilb, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 242 days.

(21) Appl. No.: 14/921,528

(22) Filed: Oct. 23, 2015

(65) Prior Publication Data
US 2017/0113736 A1   Apr. 27, 2017

(51) Int. Cl.
*B60R 21/30* (2006.01)
*B60R 21/34* (2011.01)

(52) U.S. Cl.
CPC ........ *B60R 21/34* (2013.01); *B60R 2021/343* (2013.01)

(58) Field of Classification Search
CPC .............................. B60R 21/34; B60R 21/343
See application file for complete search history.

(56) References Cited

U.S. PATENT DOCUMENTS

| 5,739,475 A | 4/1998 | Fujisawa et al. |
| 2009/0134642 A1 | 5/2009 | Wilhelm et al. |
| 2009/0023681 A1 | 9/2009 | Mahlmann et al. |
| 2011/0247172 A1* | 10/2011 | Yoshii ................. B60R 13/0206 16/2.1 |

FOREIGN PATENT DOCUMENTS

| EP | 1265022 | 12/2002 |
| JP | 2009-79613 A * | 4/2009 |

OTHER PUBLICATIONS

Engine Cover Grommet. http://www.fixmyvw.com/engine-cover-grommet-038103638k.
New Ball Style Stud. http://www.turbodieselregister.com/threads/243793-TDI-engine-coverretainer-upgrade-(ALHenginesto-04). Jan. 2002.

* cited by examiner

*Primary Examiner* — Kevin A Lathers
(74) *Attorney, Agent, or Firm* — Dinsmore & Shohl LLP

(57) ABSTRACT

A vehicle comprises an engine compartment and a hood extending over the engine compartment. An engine is situated within the engine and a pin extends from a top side of the engine toward an interior surface of the hood. An engine cover extends between the top side of the engine and the interior surface of the hood. The engine cover includes an engine cover connection and a grommet coupled to the engine cover connection. The grommet has an entrance, a stop, and an internal cavity 143 extending through the grommet from the entrance toward the stop. The internal cavity 143 is divided into a passive cavity portion and an active cavity portion. The pin rests within the passive cavity portion without passing into the active cavity portion under normal operating conditions.

20 Claims, 7 Drawing Sheets

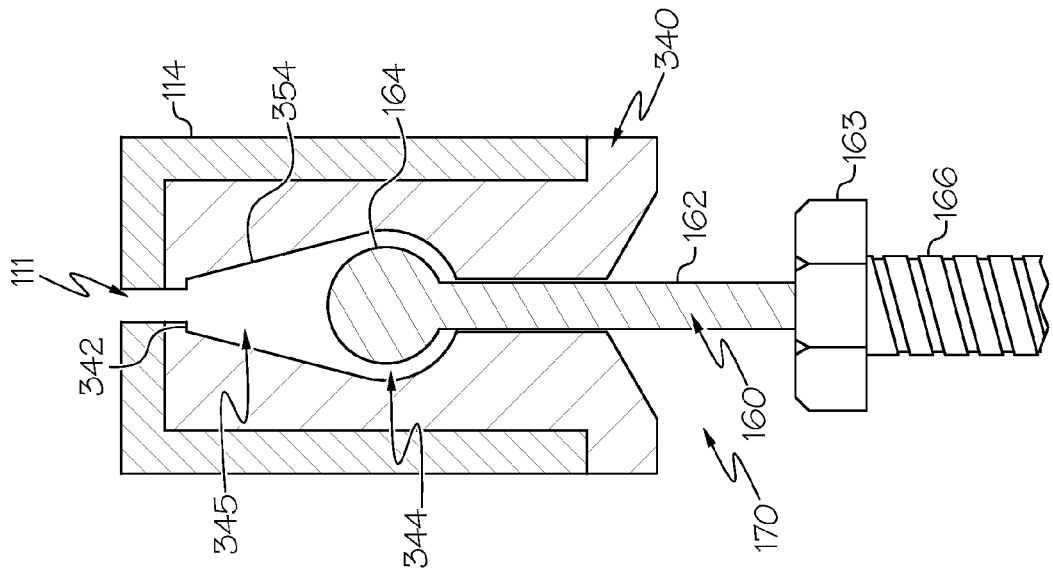
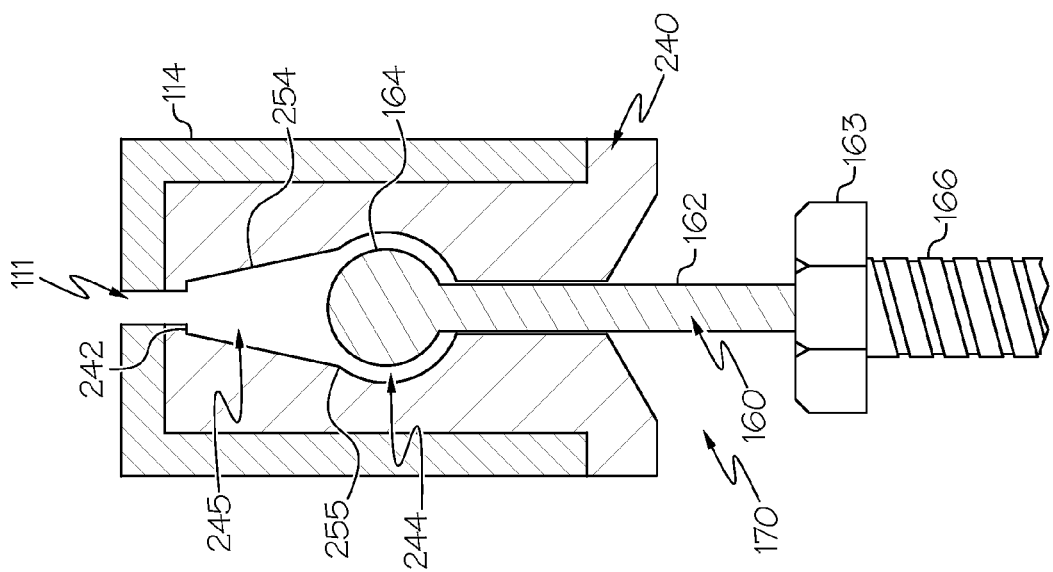
FIG. 5
FIG. 6

ENGINE COVER GROMMETS AND METHODS

TECHNICAL FIELD

The present specification relates generally to engine covers and, more specifically, to engine cover grommets for connecting engine covers to engines.

BACKGROUND

Vehicle engines are covered by a hood and, in some cases, an engine cover. The hood may provide limited protection for an impacting body form to the engine by elastically and plastically deforming to absorb energy.

In one example, a substantial portion of energy from an impacting body to the hood of the vehicle may be directed toward the engine. The hood may deform toward the engine and thus absorb a limited amount of the energy from the impact. However, a substantial amount of unabsorbed energy may stroke into the engine.

Accordingly, a need exists for structures to absorb energy during hood deformation toward the engine of the vehicle.

SUMMARY

In one embodiment, a vehicle includes an engine compartment and a hood extending over the engine compartment. An engine is situated within the engine compartment and a pin extends from a top side of the engine toward an interior surface of the hood. An engine cover extends between the top side of the engine and the interior surface of the hood. The engine cover includes at least one engine cover connection and a grommet coupled to the engine cover connection. The grommet has an entrance, a stop, and an internal cavity extending through the grommet from the entrance toward the stop. The internal cavity is divided into a passive cavity portion and an active cavity portion. The pin rests within the passive cavity portion without passing into the active cavity portion under normal operating conditions.

In another embodiment, a grommet includes a body configured to be received by an engine cover connection of an engine cover. The grommet further includes an entrance, a stop, and an internal cavity extending through the grommet from the entrance toward the stop. The passive cavity portion is configured to receive a pin. The pin rests within the passive cavity portion without passing into the active cavity portion under normal operating conditions.

In another embodiment, a method for connecting an engine cover to an engine includes installing at least one pin into a top side of an engine. The engine cover is then oriented over the pin. The engine cover comprises an engine cover connection and a grommet coupled to the engine cover connection. The grommet is configured to receive a head of the pin. The grommet includes an internal cavity extending between an entrance of the grommet toward a stop. The internal cavity includes a passive cavity portion extending from the entrance and an active cavity portion extending from the passive cavity portion toward the stop. The grommet of the engine cover is then aligned with the head of the pin. The engine cover is then attached to the pin such that the pin traverses the entrance of the grommet and rests in the passive cavity portion of the grommet. The pin rests in the passive cavity portion without passing into the active cavity portion under normal operating conditions.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 5 illustrates another exemplary embodiment of a grommet coupled to an engine cover connection according to one or more embodiments shown and described herein;

FIG. 6 illustrates another exemplary embodiment of a grommet coupled to an engine cover connection according to one or more embodiments shown and described herein;

DETAILED DESCRIPTION

Vehicles according to the present specification include an engine compartment, a hood extending over the engine compartment, and an engine situated within the engine compartment. A pin extends from a top side of the engine generally toward an interior surface of the hood. An engine cover extends between the top side of the engine and the interior surface of the hood. The engine cover includes at least one engine cover connection. As will be described herein, a grommet is coupled to the engine cover connection. The grommet includes an entrance, a stop and an internal cavity extending through the grommet from the entrance toward the stop. The internal cavity may be divided into a passive cavity portion and an active cavity portion. The pin is situated within the passive cavity portion of the grommet during normal operating conditions. As will be described in further detail below, when an impact occurs to the hood, the grommet may stroke toward the top side of the engine. When this happens, the pin may pass from the passive cavity portion of the grommet and at least partially into the active cavity portion of the grommet thereby allowing some vertical movement of the grommet and the engine cover relative to the engine.

As used herein, the term "normal operating conditions" refers to a vehicle either stationary or in motion that is operating without an external force impacting a top surface of the hood of the vehicle sufficient to deform the hood toward the engine.

As used herein, the term "stroke" refers to the motion of an article from an initial position, defined in relation to a vehicle component (e.g. a hood) under normal operating conditions, to a secondary position relative to the initial position as a result of an external force impacting the vehicle. For example, when a vehicle experiences an impact to the outside surface of the hood, the hood has a tendency to plastically and elastically deflect toward the top side of the engine. Therefore, the term stroke refers to motion of vehicle components during an impact.

Figure 1:
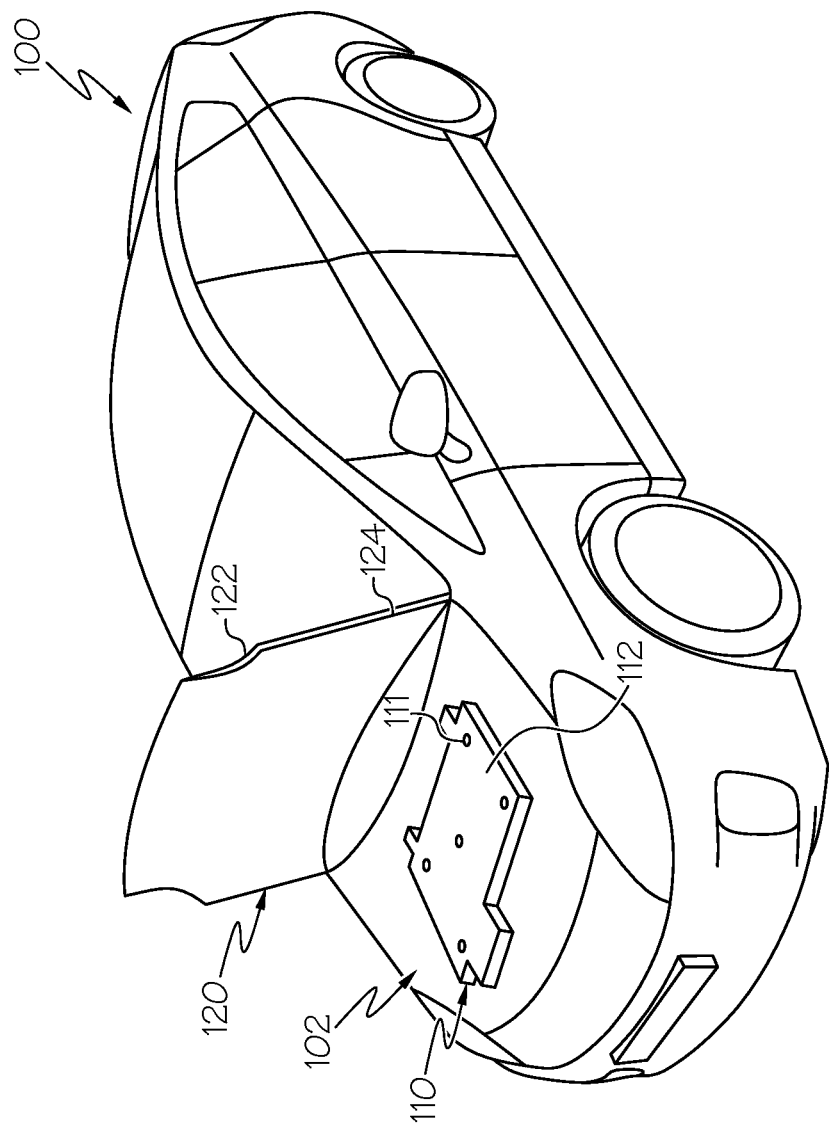
FIG. 1 depicts a perspective view of a vehicle having an engine cover according to one or more embodiments shown and described herein.

Referring initially to FIG. 1, a vehicle 100 is depicted. The vehicle 100 includes an engine compartment 102 and a hood 120 extending over the engine compartment 102. The vehicle 100 also includes an engine cover 110 disposed within the engine compartment 102 and under an interior surface 124 of the hood 120. The engine cover 110 may have a cover pressure release aperture 111 capable of providing pressure relief when the engine cover 110 is installed and during an impact 180 to the hood 120 of the vehicle 100.

Still referring to FIG. 1, the cover pressure release aperture 111 of the engine cover 110 may be visible when looking at a top view of the engine cover 110. However, the cover pressure release aperture 111 of the engine cover 110 may be hidden under a recess in the engine cover 110 such that the cover pressure release aperture 111 may not easily be seen. There may be a plurality of pressure release apertures 111. Similarly, should the circumstances require, there may only be a need for a single cover pressure release aperture 111.

Figure 2:
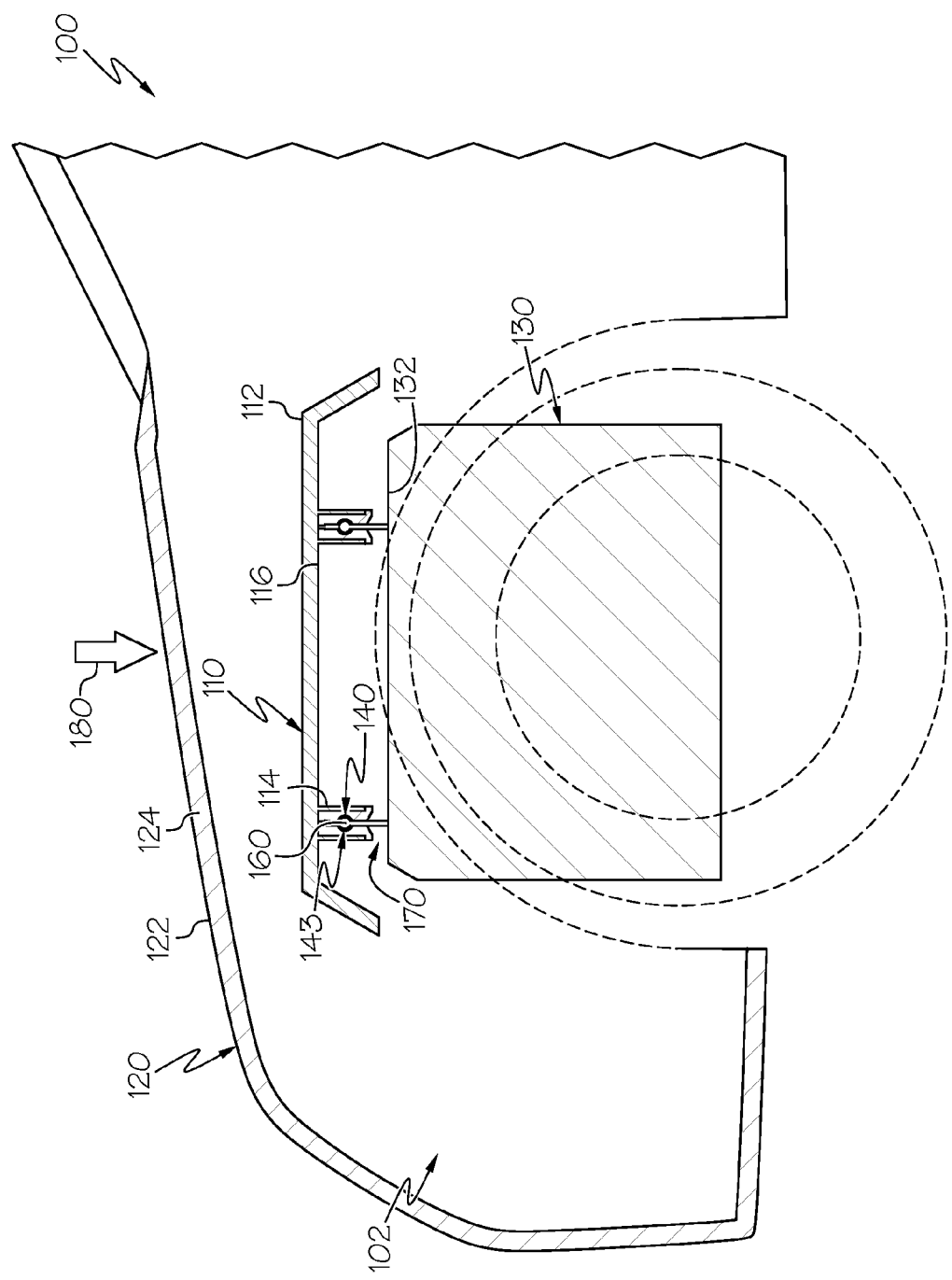
FIG. 2 schematically depicts a sectional side view of the vehicle of FIG. 1 with the engine cover attached to an engine of the vehicle according to one or more embodiments shown and described herein.

The engine cover 110 may be a variety of shapes and sizes. For example, the engine cover 110 may be shaped so as to fit a certain shape of a particular engine 130 (as shown in FIG. 2), or it may be shaped as to fit a multitude of components typically found within an engine compartment 102 of a vehicle 100. Further, the engine cover 110 may be sized anywhere from only covering a portion of an engine 130 to completely enclosing the engine cover compartment 102. The engine cover 110 may be made out of a variety of materials. One non-limiting material would be a plastic.

Referring to FIG. 2, the engine cover 110 also comprises at least one engine cover connection 114. The engine cover connection 114 is configured to receive a grommet 140. The engine cover connection 114 may extend beyond a bottom surface 116 of the engine cover 110, toward a top side 132 of an engine 130. In other embodiments, the engine cover connection 114 may extend beyond a top surface 112 of the engine cover 110 toward the interior surface 124 of the hood 120.

The engine 130 is positioned within the engine compartment 102. The top side 132 of the engine 130 is oriented toward the hood 120. A pin 160 extends from the top side 132 of the engine 130 toward the interior surface 124 of the hood 120. The engine cover 110 extends in both the vehicle's longitudinal and lateral directions between the interior surface 124 of the hood 120 and the top side 132 of the engine 130. The grommet 140 is coupled to the engine cover connection 114 and is configured to receive the pin 160.

Figure 3:
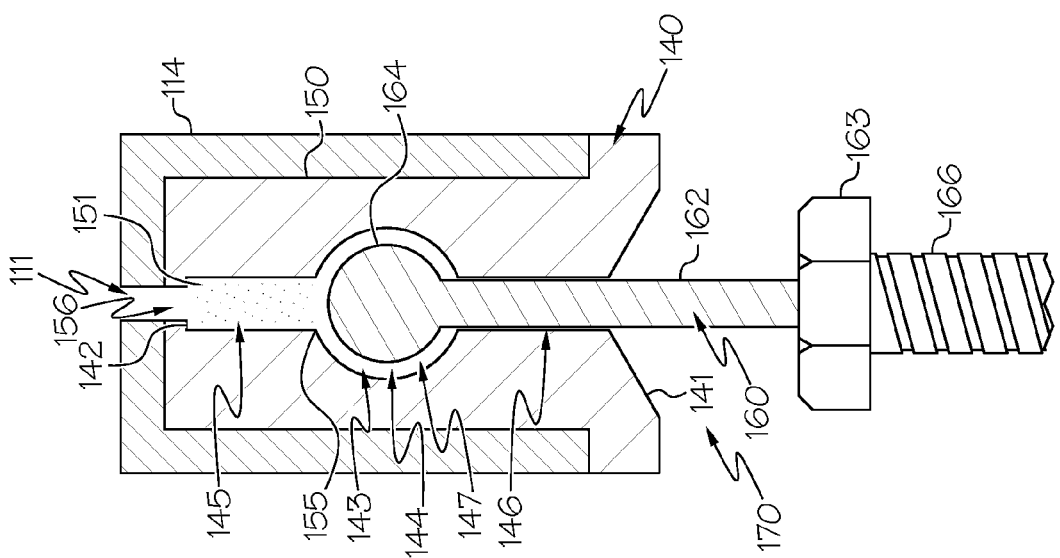
FIG. 3 illustrates an exemplary embodiment of a grommet coupled to an engine cover connection according to one or more embodiments shown and described herein.

Referring to FIG. 3, the pin 160 may include a neck 162 extending from a base 163 to a head 164. The neck 162 may have a width less than the head 164. The base 163 may be a coupler capable of receiving a tool such as a wrench or socket. A threaded fastener 166 extends from the base 163. In at least one embodiment, the pin 160 is rigidly attached to the engine 130 by way of the threaded fastener 166. The pin 160 may have a variety of shapes and sizes. The pin 160 may, in some non-limiting embodiments, have a rectangular or a round head, generally having a width or diameter that is greater than the neck 162 such that the head 164 overhangs the neck 162 in multiple directions.

The grommet 140 includes an entrance 141, a stop 142, and an internal cavity 143 extending through the grommet 140 from the entrance 141 toward the stop 142. The internal cavity 143 may be divided into at least a passive cavity portion 144 and an active cavity portion 145. Under normal operating conditions, the pin 160 rests within the passive cavity portion 144 and remains so positioned. As will be explained in more detail, under conditions where an impact 180 is occurring to the hood 120 of the vehicle 100 (as shown in FIG. 2), the pin 160 may pass from the passive cavity portion 144 and into the active cavity portion 145 to provide some additional stroke for the engine cover 110.

The entrance 141 of the grommet 140 is configured to receive the pin 160 therethrough, such that the head 164 and a portion of the neck 162 traverse the entrance 141 of the grommet 140. The entrance 141 may be a variety of shapes and sizes. For example, the entrance 141 may be a countersink extending internally into a body 148 of the grommet 140. In this exemplary embodiment, the width of the entrance 141 may decrease to a width of the passive cavity portion 144 of the grommet 140.

Still referring to FIG. 3, the passive cavity portion 144 of the grommet 140 may have a head region 147 and a neck region 146. The head region 147 may be situated between the active cavity portion 145 of the grommet 140 and the entrance 141 to the grommet 140. The head region 147 may have a width larger than the active cavity portion 145. The neck region 146 may extend between the head region 147 and the entrance 141 of the grommet 140. The neck region 146 may have a width smaller than that of the head region 147. Thus, the head 164 of the pin 160 may rest within the head region 147 of the passive cavity portion 144 of the grommet 140, and the neck 162 of the pin 160 may rest in the neck region 146 of the passive cavity portion 144 of the grommet 140. The grommet 140 and pin 160, therefore, may be coupled in an interference fit.

The stop 142 of the grommet 140 may have a grommet pressure release aperture 156. The grommet pressure release aperture 156 extends from the active cavity portion 145 of the grommet 140 to the cover pressure release aperture 111 of the engine cover 110. When the engine cover 110 is installed onto the pin 160 air pressure may build up within the internal cavity 143 of the grommet 140. Therefore, it may be desirable to relieve the pressure within the grommet 140 by allowing the buildup of air, or other fluids to escape first through the grommet pressure release aperture 156 and then through the cover pressure release aperture 111 of the engine cover 110. As such, the grommet pressure release aperture 156 may be substantially aligned with the cover pressure release aperture 111 of the engine cover 110. In some embodiments, the cover pressure release aperture 111 of the engine cover 110 may be substantially congruent to the grommet pressure release aperture 156. There may be a plurality of grommet pressure release apertures 156. In some cases, the number of grommet pressure release apertures 156 may be equal to the number of pressure release apertures 111 of the engine cover 110.

Still referring to FIG. 3, the grommet 140 may be formed in a variety of ways. Some non-limiting methods of formation include but are not limited to: compression molding, injection molding, or liquid injection molding. The grommet 140 may then subject to secondary forming processes to more precisely form the contours and distinct features of the different embodiments of the grommet 140. The grommet 140 may also be made out of a variety of materials, namely rubber or rubber-like materials.

In some embodiments, the active cavity portion 145 of the grommet 140 may further include a catch structure 155 connecting the active cavity portion 145 and the passive cavity portion 144 of the grommet 140 to inhibit the head 164 of the pin 160 from passing into the active cavity portion 145 of the grommet 140 under lower loading conditions, i.e., normal operating conditions. In some embodiments, the width of the catch structure 155 is less than that of the head 164 of the pin 160. The width of the active cavity portion 145 of the grommet 140 may be substantially uniform with the width of the catch structure 155. The width of the catch structure 155 and the active cavity portion 145 of the grommet 140 may be tuned to provide a preselected amount of resistance against passage of the head 164 of the pin 160 from the passive cavity portion 144 to the active cavity portion 145 of the grommet 140. For example, where the width of the active cavity portion 145 of the grommet 140 is much smaller than the width of the passive cavity portion 144, a greater amount of energy from the impact may be absorbed. In doing so, however, the stroke of the grommet 140 to the engine 130 may be shortened. In an opposite example, where the width of the active cavity portion 145 of the grommet 140 is not much smaller than the width of the passive cavity portion 144 of the grommet 140, a lesser amount of energy from the impact may be absorbed. In this case, the additional stroke provided between the grommet 140 and the engine 130 may be lengthened. It is desirable to both absorb energy from the impact 180 while maximizing the stroke experienced by the grommet 140.

Still referring again to FIG. 3, an energy absorbing material 151 may occupy the active cavity portion 145 of the grommet 140. The energy absorbing material 151 may occupy anywhere from the entirety of the active cavity portion 145 to only a portion of the active cavity portion 145. The energy absorbing material 151 may be a variety of materials. Two non-limiting examples include foam or soft rubber. The energy absorbing material 151 is capable of deforming about the head 164 of the pin 160, when the pin 160 engages the active cavity portion 145 of the grommet 140. The energy absorbing material 151 may be inserted into the active cavity portion 145 of the grommet 140 in a secondary process after the contours of the grommet 140 have been formed. Further, the energy absorbing material 151 may be used in a variety of embodiments of the present specification and is not limited to use by itself. For example, the energy absorbing material 151 could occupy the active cavity portion 145 of the grommet 140 in any of the embodiments disclosed in FIGS. 5-8.

As such, to connect the engine cover 110 to the engine 130, at least one pin 160 is installed into the top side 132 of the engine 130. The engine cover 110 may then be oriented over the pin 160, such that the grommet 140 is aligned with the pin 160. The engine cover 110 is then attached to the pin 160. When attaching the engine cover 110 to the engine 130, the pin 160 traverses the entrance 141 of the grommet 140 and rests in the passive cavity portion 144 of the grommet 140. Under normal operating conditions, the pin 160 remains in the passive cavity portion 144 of the grommet 140. Generally, the engine cover 110 may be attached by pressing the engine cover 110 down on top of the pin 160 until the pin 160 rests in the passive cavity portion 144 of the grommet 140.

When an object impacts the hood of a vehicle, the hood may elastically or plastically deform or stroke toward the engine and as such absorbs some of the energy of the impact. The impact may be of such a magnitude that the hood continues stroking such that it contacts an engine cover of the vehicle. The engine cover may also begin to stroke toward the engine. The engine cover may be designed to accommodate the introduction of the energy of the impact, such that the engine cover may provide increased energy absorption. This absorption of energy may decrease the magnitude of acceleration experienced when the object causing the impact comes in contact with the engine itself. Particularly, the grommets of the engine cover described herein may be tuned to dissipate the energy associated with the impact and decrease the acceleration experienced once the impacting object reaches the engine.

FIGS. 2 and 3 illustrate the vehicle 100 and grommet 140 just prior to an impact 180 to the hood 120 of the vehicle 100. Referring only to FIG. 3, during normal operation, prior to an impact, the pin 160 is coupled to the top side 132 of the engine 130 and rests in the passive cavity portion 144 of the grommet 140 and may not pass into the active cavity portion 145 of the grommet 140.

Figure 4A:
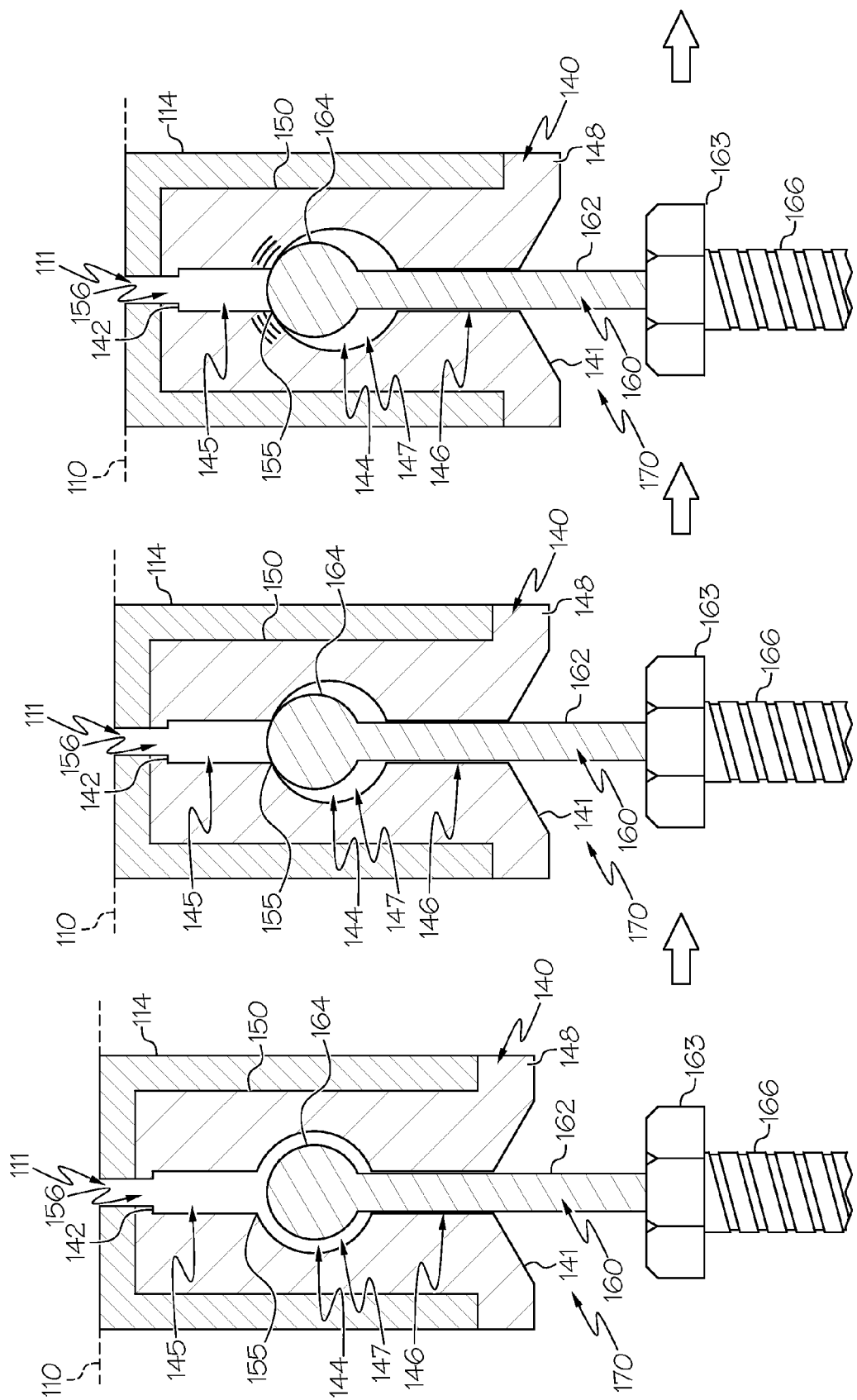
FIG. 4A illustrates movement of the grommet of FIG. 3, wherein a pin passes from a passive cavity portion of the grommet toward an active cavity portion of the grommet according to one or more embodiments shown and described herein.
Figure 4B:
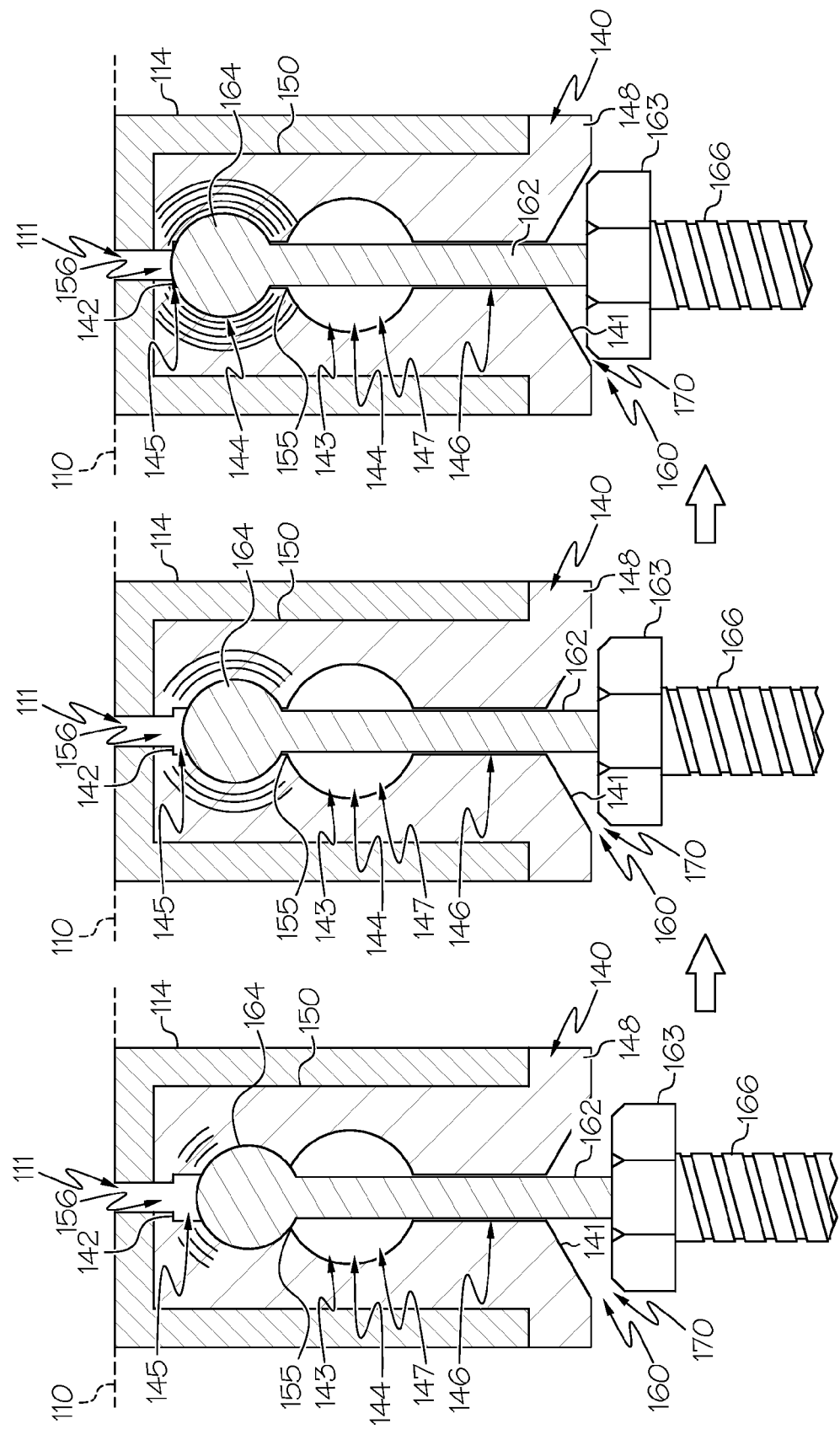
FIG. 4B continues to illustrate movement of the grommet of FIG. 3, wherein a pin passes from a passive cavity portion of the grommet toward an active cavity portion of the grommet according to one or more embodiments shown and described herein.

FIGS. 4A and 4B illustrate the sequence of events that may happen should an impact 180 (as shown in FIG. 2), which translates through the hood 120 of the vehicle 100, contact the engine cover 110. Initially, the pin 160 is in the passive cavity portion 144 of the grommet 140. Once the energy of the impact 180 translates to the engine cover 110, the engine cover 110, along with the engine cover connection 114 and the grommet 140, coupled to the engine cover connection 114, begins to stroke toward the base 163 of the pin 160 and thus, toward the engine 130. As can be seen, a gap 170 is provided between the grommet 140 and the base 163 of the pin 160 to facilitate stroking of the grommet 140 toward the base 163 of the pin 160, and as such toward the top side 132 of the engine 130. The head 164 of the pin 160 may first contact the catch structure 155 of the active cavity portion 145 of the grommet 140. In other embodiments, there might not be a catch structure, as in FIG. 6, so the pin 160 may first contact a sloped wall 154 of the active cavity portion 145 of the grommet 140.

As the energy of the impact 180 continues to force the grommet 140 toward the base 163 of the pin 160, the catch structure 155 may begin to deform about the head 164 of the pin 160 as the head 164 of the pin 160 passes into the active cavity portion 145 of the grommet 140. The deformation allows for some of the energy of the impact 180 to be absorbed.

The active cavity portion 145 of the grommet 140 continues to absorb the energy of the impact as the head 164 of the pin 160 passes further into the active cavity portion 145 of the grommet 140 and more of the active cavity portion 145 of the grommet 140 deforms about the head 164 of the pin 160. It should be noted that the pin 160 need not pass completely into the active cavity portion 145 of the grommet 140. The stroking of the grommet 140 may stop prior to the head 164 of the pin 160 fully passing into the active cavity portion 145 of the grommet 140. The amount of stroking that occurs is dependent on the force of the impact 180 as well as the specific tuning of the grommet 140. For example, if the grommet 140 has a stiffer configuration the amount of stroking may be lessened. In some embodiments, the grommet 140 may be capable of stroking at least up to 10 mm toward the top side 132 of the engine 130 in response to an impact with a 5 kg weight.

If the grommet 140 continues to stroke toward the base 163 of the pin 160, the head 164 of the pin 160 may eventually contact the stop 142 of the active cavity portion 145 of the grommet 140. Once the pin 160 comes in contact with the stop 142, the grommet 140 may not stroke toward the engine 130 further. Acceleration may be lessened due to the additional stroking ability provided by the grommet 140 of the present specification.

FIGS. 5-8 illustrate exemplary grommet embodiments using a variety of resistance structures to tune a resistance to the head 164 of the pin 160 passing into and through the active cavity portion of the grommet.

Referring first to FIG. 5, an active cavity portion 245 of a grommet 240 may extend from a catch structure 255 toward a stop 242 with the width of the active cavity portion 245 decreasing from the catch structure 255 toward the stop 242. In this embodiment, the active cavity portion 245 of the grommet 240 may have a sloped wall 254.

Referring to FIG. 6, in some embodiments, an active cavity portion 345 of a grommet 340 may not have a catch structure. In this embodiment, the active cavity portion 345 of the grommet 340 extends directly from a passive cavity portion 344 toward a stop 342. Thus, the active cavity portion 345 may slope smoothly from the passive cavity portion 344 toward the stop 342 such that the width of the active cavity portion 345 decreases from the passive cavity portion 344 toward the stop 342 without a noticeable interruption in the transition.

Figure 7:
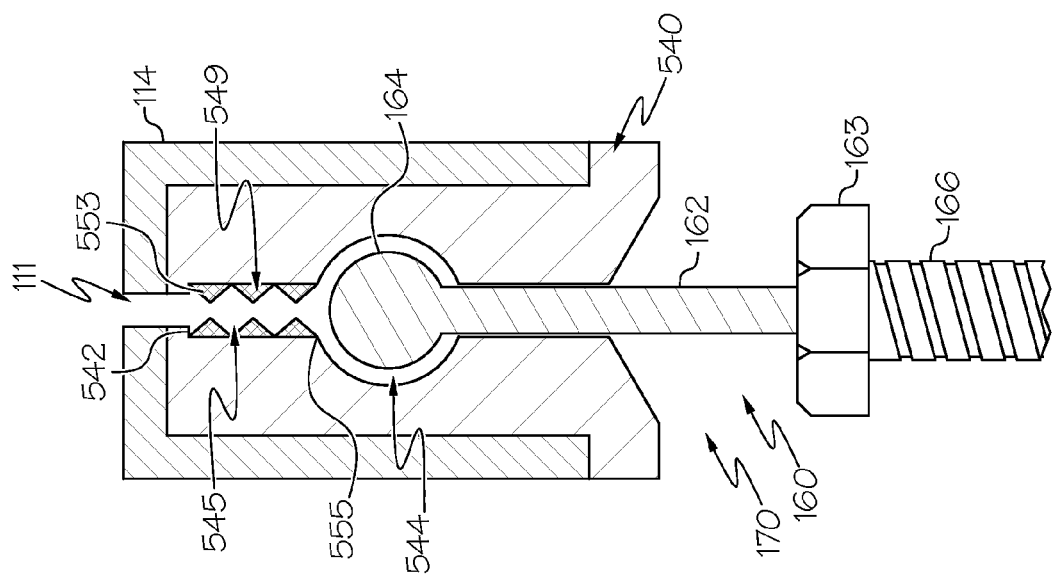
FIG. 7 illustrates another exemplary embodiment of a grommet coupled to an engine cover connection according to one or more embodiments shown and described herein.

Referring now to FIG. 7, a grommet 440 may have a cutout 452 disposed on an outside surface 450 of the grommet 440. The cutout 452 may fully circumscribe the outside surface 450 of the grommet 440. In another embodiment, the cutout 452 may be a plurality of cutouts 452 that pock the outside surface 450 in a variety of configurations. Such configurations could include random placement of cutouts 452 or a patterned placement of cutouts 452. In embodiments where the cutout 452 fully circumscribes the outside surface 450 of the grommet 440, there may be a plurality of cutouts 452. FIG. 7 shows two cutouts 452; however, this is by no means a limiting construction. For example there could be just one cutout 452 or there could be a multitude of cutouts 452. The cutouts 452 are configured such the active cavity portion 445 may deform more easily about the pin 460, when the pin 160 engages the active cavity portion 445 of the grommet 440 by providing one or more spaces between the grommet 440 and the engine cover connection 114 of the engine cover 110. Therefore, the size of the cutout 452 is dependent on the desired ease of deformation of the active cavity portion 445 of the grommet 440 about the head 164 of the pin 160. For example, a larger cutout 452 would allow an active cavity portion 445 of the grommet 440 to more easily deform about the head 164 of the pin 160. Thus, the grommet 440 may be tuned to achieve the desired result based on the ease of deformation sought. The cutout 452 may be formed concurrently with the contours of the grommet 440, or the cutout 452 may be formed in the outside surface 450 of the grommet 440 in a secondary process.

Figure 8:
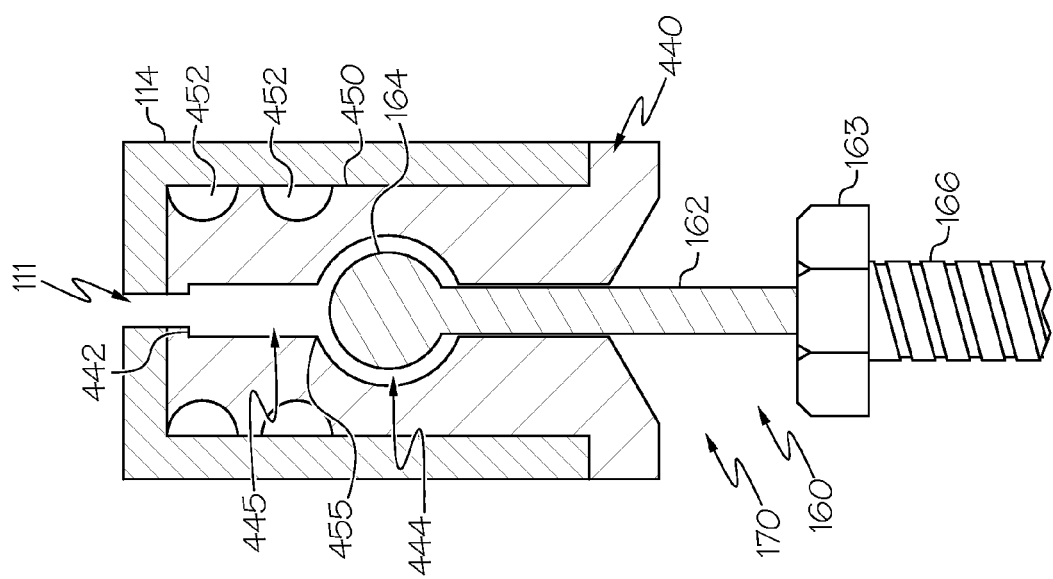
FIG. 8 illustrates another exemplary embodiment of a grommet coupled to an engine cover connection according to one or more embodiments shown and described herein.

Referring now to FIG. 8, a grommet 540 may have at least one tooth 553 extending from an inside surface 549 of the grommet 540. The tooth 553 may circumscribe an active cavity portion 545 of the grommet 540. In some embodiments, there may be a plurality of teeth 553 disposed on the inside surface 549 of the grommet 540. The tooth 553 may have a variety of shapes and sizes. Two non-limiting embodiments include the tooth 553 having a substantially triangular cross section or the tooth 553 having a cross section that extends to a more rounded tip. The tooth 153 may be formed concurrently with the contours of the active cavity portion 545 of the grommet 540.

The above-described engine cover and grommet provides additional structure that may be used to absorb impact energy when a head form impacts a hood of a vehicle. As such, the grommet provides additional stroke which allows more of the impact energy to be dissipated before the energy of the impact reaches the engine of the vehicle. While the grommets are described in the context of impacts to the hood of the car, similar grommets could be used to allow for additional stroke in the event of an impact to other vehicle panels.

In is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed:

1. A vehicle comprising:
  an engine compartment;
  a hood extending over the engine compartment;
  an engine situated within the engine compartment;
  a pin extending from a top side of the engine toward an interior surface of the hood;
  an engine cover extending between the top side of the engine and the interior surface of the hood, the engine cover comprising an engine cover connection; and
  a grommet coupled to the engine cover connection, the grommet comprising an entrance, a stop, and an internal cavity extending through the grommet from the entrance toward the stop, the internal cavity being divided into a passive cavity portion and an active cavity portion, wherein the pin rests in the passive cavity portion without passing into the active cavity portion under normal operating conditions, wherein the stop of the grommet comprises a grommet pressure release aperture extending from the active cavity portion of the grommet toward the engine cover, the grommet pressure release aperture having a width less than a width of the active cavity portion of the grommet.

2. The vehicle of claim 1, wherein the passive cavity portion of the grommet comprises:
  a head region between the active cavity portion and the entrance of the grommet, the head region having a width larger than the active cavity portion; and
  a neck region extending between the head region and the entrance of the grommet such that when the pin is disposed within the passive cavity portion of the grommet, a head of the pin rests within the head region and a neck of the pin rests within the neck region of the passive cavity portion.

3. The vehicle of claim 2, wherein the head of the pin has a width larger than a width of the active cavity portion of the grommet.

4. The vehicle of claim 1 further comprising an energy absorbing material that occupies the active cavity portion of the grommet and is capable of deforming about a head of the pin.

5. The vehicle of claim 1, wherein:
the engine cover further comprises a cover pressure release aperture, wherein the grommet pressure release aperture is aligned with the cover pressure release aperture of the engine cover.

6. The vehicle of claim 1, wherein the grommet further comprises a cutout that is disposed on an outside surface of the grommet.

7. The vehicle of claim 1, wherein the active cavity portion of the grommet comprises a tooth extending from an inside surface of the grommet.

8. The vehicle of claim 1, wherein the grommet further comprises a catch structure connecting the active cavity portion and the passive cavity portion of the grommet to inhibit a head of the pin from passing into the active cavity portion of the grommet, the active cavity portion of the grommet extending from the catch structure toward the stop, a width of the active cavity portion decreasing from the catch structure toward the stop.

9. The vehicle of claim 1, wherein the active cavity portion of the grommet extends from the passive cavity portion toward the stop, a width of the active cavity portion decreasing from the passive cavity portion toward the stop.

10. A grommet comprising:
a body configured to be received by an engine cover connection of an engine cover;
an entrance;
a stop; and
an internal cavity disposed within the body of the grommet extending through the grommet from the entrance toward the stop, the internal cavity being divided into a passive cavity portion and an active cavity portion, the passive cavity portion being configured to receive a pin, wherein the stop comprises a grommet pressure release aperture extending from the active cavity portion toward the engine cover when installed in the engine cover connection, the grommet pressure release aperture having a width less than a width of the active cavity portion of the grommet.

11. The grommet of claim 10, wherein the passive cavity portion of the grommet comprises:
a head region between the active cavity portion and the entrance of the grommet, the head region having a width larger than the active cavity portion and configured to receive a head of the pin; and
a neck region extending between the head region and the entrance of the grommet configured to be traversed by the head of the pin, such that a neck of the pin rests in the neck region.

12. The grommet of claim 11, wherein the width of the active cavity portion of the grommet has a width smaller than the head region of the passive cavity portion of the grommet.

13. The grommet of claim 10 further comprising an energy absorbing material occupying the active cavity portion of the grommet.

14. The grommet of claim 10 further comprising a cutout being disposed on an outside surface of the grommet.

15. The grommet of claim 10 further comprising a catch structure connecting the active cavity portion and the passive cavity portion of the grommet to inhibit a head of the pin from passing into the active cavity portion of the grommet, the active cavity portion of the grommet extending from the catch structure toward the stop, a width of the active cavity portion decreasing from the catch structure toward the stop.

16. The grommet of claim 10, wherein the active cavity portion of the grommet extends from the passive cavity portion toward the stop, a width of the active cavity portion decreasing from the passive cavity portion toward the stop.

17. A method for connecting an engine cover to an engine comprising:
installing at least one pin into a top side of the engine;
orienting the engine cover over a pin, wherein the engine cover comprises an engine cover connection and a grommet coupled to the engine cover connection, the grommet being configured to receive a head of the pin, the grommet comprising an internal cavity extending between an entrance of the grommet toward a stop, the internal cavity comprising a passive cavity portion extending from the entrance and an active cavity portion extending from the passive cavity portion toward the stop, wherein the stop comprises a grommet pressure release aperture extending from the active cavity portion toward the engine cover when installed in the engine cover connection, the grommet pressure release aperture having a width less than a width of the active cavity portion of the grommet;
aligning the grommet of the engine cover with the head of the pin; and
attaching the engine cover to the pin, the head of the pin traversing the entrance of the grommet and resting in the passive cavity portion of the grommet, wherein the pin rests in the passive cavity portion without passing into the active cavity portion under normal operating conditions.

18. The method of claim 17 wherein the passive cavity portion of the grommet comprises:
a head region between the active cavity portion and the entrance of the grommet, the head region having a width larger than the active cavity portion and configured to receive the head of the pin; and
a neck region extending between the head region and the entrance of the grommet configured to be traversed by the head of the pin such that a neck of the pin rests in the neck region.

19. The method of claim 17, wherein the engine cover connection comprises a cover pressure release aperture aligned with the stop of the grommet, the cover pressure release aperture having width smaller than the active cavity portion of the grommet.

20. The method of claim 17, wherein the grommet pressure release aperture of the stop of the grommet is aligned with a cover pressure release aperture of the engine cover.

* * * * *